United States Patent
Kharat et al.

(10) Patent No.: US 8,549,543 B2
(45) Date of Patent: Oct. 1, 2013

(54) VIRTUALIZE, CHECKPOINT, AND RESTART POSIX IPC OBJECTS DURING CHECKPOINTING AND RESTARTING OF A SOFTWARE PARTITION

(75) Inventors: Satish Narayan Kharat, Bangalore (IN); Rajeev Mishra, Bangalore (IN); Lance Warren Russell, Rosanky, TX (US); Suresh Sabarathinam, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1401 days.

(21) Appl. No.: 12/242,218

(22) Filed: Sep. 30, 2008

(65) Prior Publication Data

US 2010/0082816 A1    Apr. 1, 2010

(51) Int. Cl.
G06F 3/00 (2006.01)
G06F 9/44 (2006.01)
G06F 9/46 (2006.01)
G06F 13/00 (2006.01)

(52) U.S. Cl.
USPC .......................................... 719/319; 719/313

(58) Field of Classification Search
None
See application file for complete search history.

(56) References Cited

U.S. PATENT DOCUMENTS

| | | |
|---|---|---|
| 6,795,966 B1 | 9/2004 | Lim et al. |
| 6,934,755 B1 | 8/2005 | Saulpaugh et al. |
| 7,191,440 B2 | 3/2007 | Cota-Robles et al. |
| 7,191,441 B2 | 3/2007 | Abbott et al. |
| 8,266,636 B2 | 9/2012 | Kharat et al. |
| 2005/0257080 A1 | 11/2005 | Santos et al. |
| 2005/0268298 A1 | 12/2005 | Hunt et al. |
| 2009/0007147 A1 | 1/2009 | Craft et al. |
| 2009/0157882 A1 | 6/2009 | Kashyap |
| 2010/0083283 A1 | 4/2010 | Kharat et al. |

OTHER PUBLICATIONS

Oren Laadan and Jason Nieh; Transparent Checkpoint-Restart of Multiple Processes on Commodity Operating Systems; Jun. 2007; 14 pages.*
Richard McDougall and Jim Mauro; Solaris™ Internals: Solaris 10 and OpenSolaris Kernel Architecture, Second Edition; Jul. 10, 2006; excerpted 6 pages.*
Steven Osman, Dinesh Subhraveti, Gong Su, and Jason Nieh; The Design and Implementation of Zap: A System for Migrating Computing Environments; Dec. 2002; 16 pages.*
Office Action, dated Feb. 15, 2012, regarding U.S. Appl. No. 12/242,156, 16 pages.
Notice of Allowance, dated May 11, 2012, regarding U.S. Appl. No. 12/242,156, 7 pages.

* cited by examiner

Primary Examiner — H S Sough
Assistant Examiner — Kimberly Jordan
(74) Attorney, Agent, or Firm — Yee & Associates, P.C.; David A. Mims, Jr.

(57) ABSTRACT

A WPAR is migrated. Responsive to starting a checkpoint process, data and control information is collected and stored for IPC objects in the WPAR. Responsive to receiving a request to restart the WPAR, a type of IPC object is determined. Responsive to a determination that the IPC object is not an IPC shared memory object, a kernel handle that a process wants to be used for a new IPC object is registered. A request to create a new IPC object comprising a name uniquely associated with the IPC object and a WPAR identifier is issued. An entry that matches the name and WPAR identifier is identified and a virtual kernel handle is retrieved. The new IPC object is created. The virtual kernel handle is mapped to a real kernel handle and returned to the process. Data and control information is retrieved and overlaid onto the new IPC object.

20 Claims, 7 Drawing Sheets

VIRTUALIZE, CHECKPOINT, AND RESTART POSIX IPC OBJECTS DURING CHECKPOINTING AND RESTARTING OF A SOFTWARE PARTITION

This invention was made with Government support under Contract No. HR0011-07-9-0002 awarded by Defense Advanced Research Projects Agency (DARPA). The government has certain rights in this invention.

BACKGROUND OF THE INVENTION

1. Field of the Invention

The present invention relates generally to a data processing system. More particularly, the present invention is directed to a computer implemented method, system, and computer-usable program code for checkpointing and restarting workload partitions.

2. Description of the Related Art

A workload partition (WPAR) is a virtualized operating system environment within a single instance of an operating system. A WPAR is a software partition that provides isolation of software services, applications, and administration by utilizing flexible software-defined boundaries within the single instance of an operating system. There are two types of WPARs, a system WPAR and an application WPAR. System WPARs are virtual system environments that closely resemble a logical partition or a separate system. System WPARs have their own private file systems, users and groups, login, network space, and administrative domain. All system WPARs share the same global kernel. This means each system WPAR will run its own copy of user space programs but share the kernel (operating system) with the rest of the WPARs and the global operating system. User space is not part of a kernel. User space is that portion of system memory in which user processes run. This contrasts with kernel space, which is that portion of memory in which the kernel executes and provides its services. Application programs execute in user space.

A system WPAR can be booted, accessed, and shutdown like a stand-alone data processing system. Application WPARs are light weight environments used to isolate the execution of one or more application processes. WPAR mobility is an extension to both system and application WPARs that provides the functionality to move an actual running workload from one physical data processing system to another physical data processing system.

POSIX is an acronym for Portable Operating System Interface for UNIX, a set of IEEE and ISO standards that define an application programming interface (API), along with shell and utilities interfaces for software compatible with variants of the Unix operating system. By designing their programs to conform to POSIX, developers have some assurance that their software can be easily ported to POSIX-compliant operating systems. This includes most varieties of UNIX.

Many operating systems that are compliant with the POSIX standard, use POSIX inter-process communication (IPC) objects. Inter-process communication is a set of techniques, often referred to as objects, for exchanging data among two or more threads in one or more processes. POSIX IPC objects can be one of three kinds of objects: POSIX message queues, semaphore objects, and shared memory segments. A semaphore is a protected variable, an entity storing a value, or abstract data type, an entity grouping several variables that may or may not be numerical, that restricts access to shared resources in a multi-programming environment. An IPC semaphore object locks or unlocks shared resources. Message queues provide a way of sending a block of data from one process to another. Different processes can communicate by sending and receiving messages to and from the message queue. Shared memory segments provide an efficient way of directly sharing an address space between multiple processes.

BRIEF SUMMARY OF THE INVENTION

According to one embodiment of the present invention, a workload partition is migrated. Responsive to starting a checkpoint process on the workload partition in a first data processing system, data and control information is collected for each inter-process communication (IPC) object used by each process in the workload partition. The data and control information is stored, forming checkpoint data. Responsive to receiving a request to restart the workload partition in a second data processing system, a type of IPC object is determined. Responsive to a determination that the type of IPC object is not an IPC shared memory object, a kernel handle that a process in the workload partition wants to be used for a new IPC object that is to be created is registered, forming a virtual kernel handle. A request that the new IPC object be created is issued by the process. The request comprises a name uniquely associated with an IPC object and a workload partition identifier that identifies the workload partition of the process. A data structure is checked to identify an entry that matches the name and the workload partition identifier in the request. The virtual kernel handle for the entry is retrieved. The new IPC object is created. The virtual kernel handle is mapped to a kernel handle used by the kernel for the IPC object. The virtual kernel handle is returned to the process. The data and control information for an IPC object associated with the virtual kernel handle is retrieved from the checkpoint data. The data and control information is overlaid on to the new IPC object. Per-process information is restored.

DETAILED DESCRIPTION OF THE INVENTION

Figure 1:
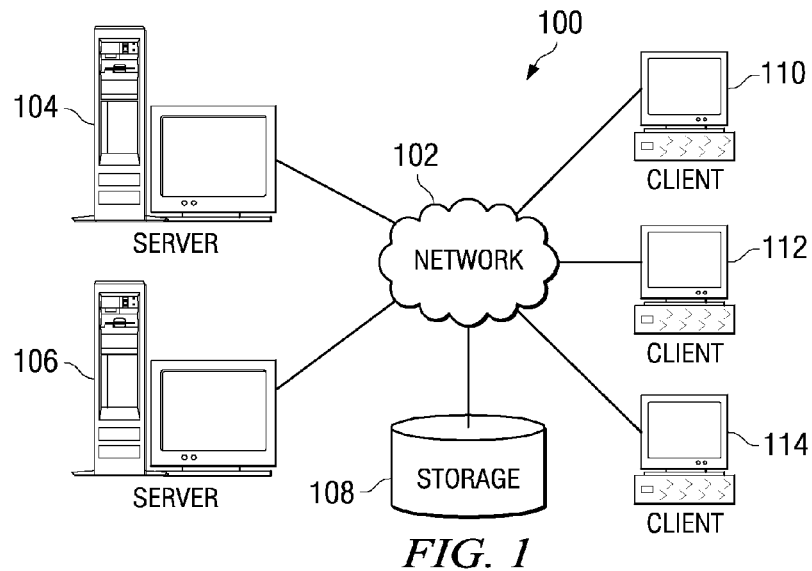
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
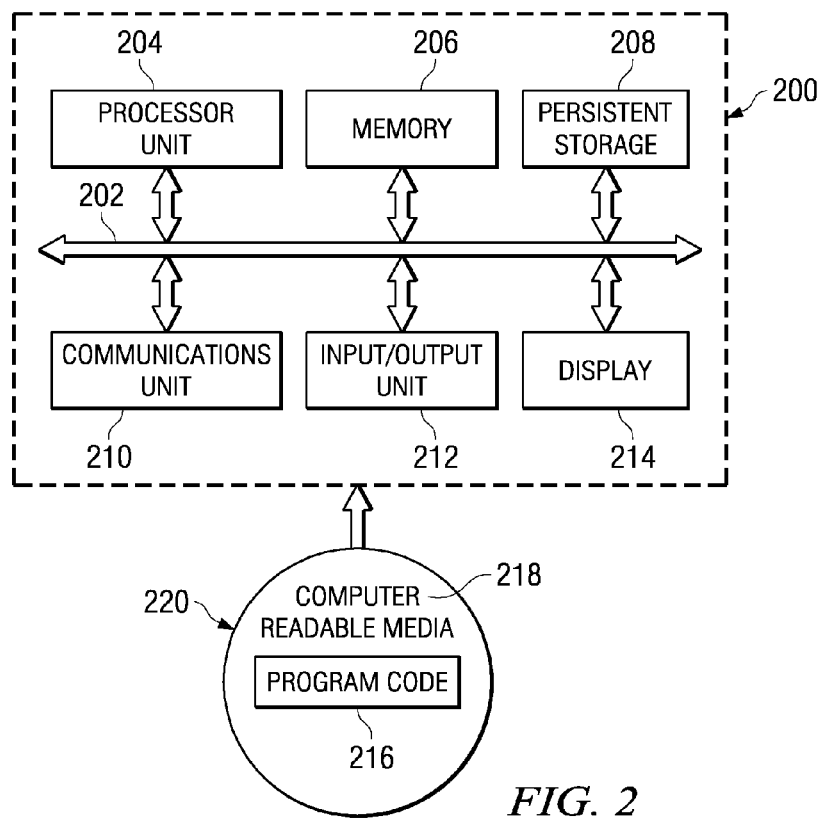
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer recordable storage media. In some instances, computer recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

WPARs can be moved and restarted on the same or a different data processing system. In order to move and restart a running WPAR, the running WPAR must be checkpointed and restarted. Checkpointing means saving a "snapshot" of the state of a current application state, such as the state of a running WPAR, for use in restarting the application. Restarting means restoring the saved snapshot on the same or a different data processing system. A successful checkpoint and restart of a running WPARs that uses IPC objects requires that the IPC objects used by the running WPAR should be checkpointed and restarted as well. In order for the checkpoint and restart of a WPAR to be transparent, after the restart the application/programs in the WPAR should be able to continue working with the IPC objects created before the checkpoint. Transparent means that the application program is not aware of the checkpoint and restart process.

Exemplary embodiments provide for virtualizing, checkpointing, and restarting IPC objects in order to enable checkpointing and restarting of a WPAR. Exemplary embodiments satisfy the following five constraints: (1) the same POSIX IPC name of a given POSIX IPC type in different WPARs on the same data processing system should refer to different IPC objects in the operating system kernel; (2) for a WPAR that undergoes a checkpoint and is restarted later on the same or a different data processing system, the IPC objects present in the WPAR at the time of checkpoint of the WPAR should remain valid after the restart of the WPAR; (3) the applications in the WPAR should be able to use the IPC objects after the restart of the WPAR the same way the applications used the IPC objects before the checkpoint of the WPAR; (4) the attributes, such as access modes, the user identity of the creator, the user identity of the owner, and the state, such as the semaphore state, messages in the message queue, and so forth of the IPC object, must be preserved across the checkpoint-restart cycle; and (5) the programs/applications running inside the WPAR need not be aware of the checkpoint and restart process.

Exemplary embodiments provides for checkpointing and restarting IPC objects in order to checkpoint and restart WPARs. Isolation of the POSIX IPC name, or IPC name, across WPARs is achieved by associating a WPAR identifier in the name-kernel handle table, which is explained more fully later. Thus, according to an exemplary embodiment, when searching for a particular IPC name in the name-kernel handle table, not only must the name be matched exactly, but also the WPAR identifier field in the name-kernel handle table must also match the WPAR identifier of the WPAR in which the current process is running.

In order for the checkpoint and restart processes to function according to constraints 2-5, exemplary embodiments provide for virtualizing the IPC identifier used by the kernel before passing the IPC identifier to user space. Exemplary embodiments also provide for using the virtual IPC identifier in the name table and the per-process descriptor table.

The attributes and the state of the IPC objects are stored in the operating system kernel. Exemplary embodiments provide for retrieving the state and the attributes of the IPC objects from the user space during the checkpoint of a WPAR from user space. Further, exemplary embodiments restore the attributes and state saved during checkpointing the WPAR from user space during the restarting of the WPAR on the new data processing system. WPAR checkpoint and restart is driven from the user space even though most of the data to be collected is in the kernel. This is because the checkpoint operation involves a lot of operation other than collecting or setting data to and from the kernel. IPC checkpoint and restart part of the larger WPAR checkpoint and restart mechanism is also driven from user space.

Exemplary embodiments ensure that the IPC objects of the WPAR can be used the same way after the restart of a WPAR as the IPC objects were being used at the time of checkpointing the WPAR. Exemplary embodiments provide for retrieving and restoring the state and the attributes of IPC objects from the user space by using new and existing system call application program interfaces (APIs).

POSIX IPC objects are uniquely identified in a system using unique names. When an application process needs to use a particular IPC object, the application first needs to get a handle to that object. According to the POSIX standards, this is done by calling function like sem_open, mq_open, and shm_open by providing the name of the IPC object the process wants to open.

The sem_open call returns a pointer to sem_t, mq_open returns the message queue descriptor mqd_t. In an exemplary implementation the kernel returns the 'kernel handle' to the IPC object that is being opened. Then sem_open and mq_open library function copies the kernel handle into a memory location of the process and returns the address of that location from the open function. The application process uses this descriptor to refer to IPC semaphore and message queue objects after opening the IPC object.

The shm_open returns a file descriptor. The kernel links the kernel handle of the shm descriptor to file descriptor and returns that file descriptor. The application processes use this file descriptor to refer IPC shared memory objects after opening the shared memory objects.

The kernel handle for an IPC object is created when the IPC object is created. The kernel also keeps a map of the IPC object name against the kernel handle to convert from name to the IPC object.

Figure 4:
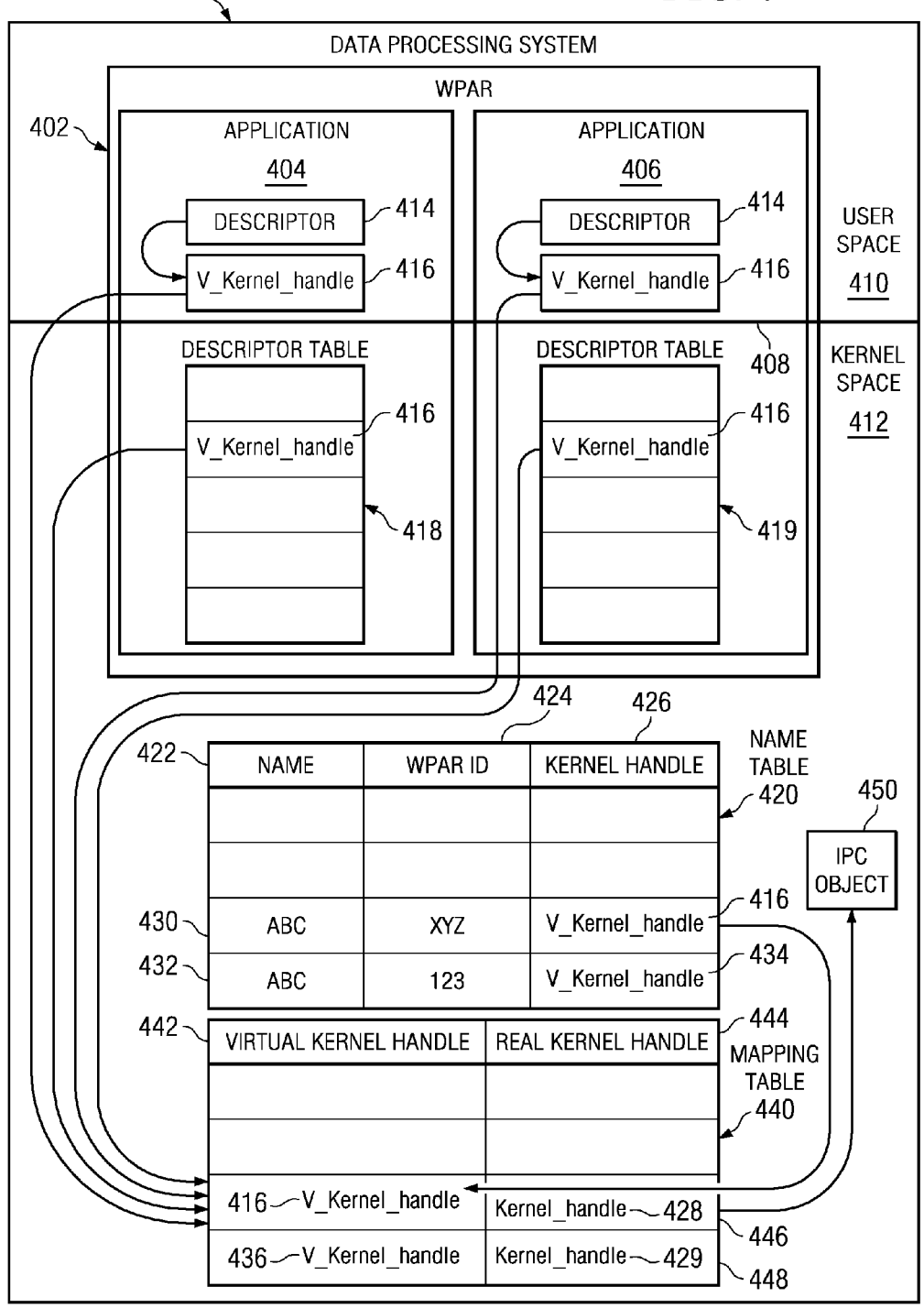
FIG. 4 is a block diagram illustrating a mapping of identifiers in accordance with an exemplary embodiment.

For the IPC semaphore and message queue objects, the kernel keeps a per-process IPC descriptor table. The descriptor table maps the kernel handle to an IPC descriptor. This helps the kernel in freeing the POSIX IPC objects being used by a process when the process is exiting. When no more processes refer to the IPC object (its usage count becomes 0), the IPC object is deleted For the IPC semaphore and message queue objects, the value of the kernel handle is stored in the application address space. When the WPAR is checkpointed and restarted the kernel handle being used at checkpoint time might not be available at restart time. Also, it is not possible to find the location where the kernel handle is stored in the application address space in order to change the kernel handle. Hence, it is necessary that the old kernel handle be maintained for the application even after the restart of the workload partition on a new data processing system. Exemplary embodiments provide a method of virtualization to take care of the above issues. According to an exemplary embodiment, a new real-virtual kernel descriptor handle table is added and all the kernel handles used in the user space and other parts of the kernel are always virtual kernel handles. There is one real-virtual table per workload partition, an example of which is shown in FIG. 4. Thus, the problem of possible conflict of kernel handles when a workload partition is restarted is overcome.

Figure 3:
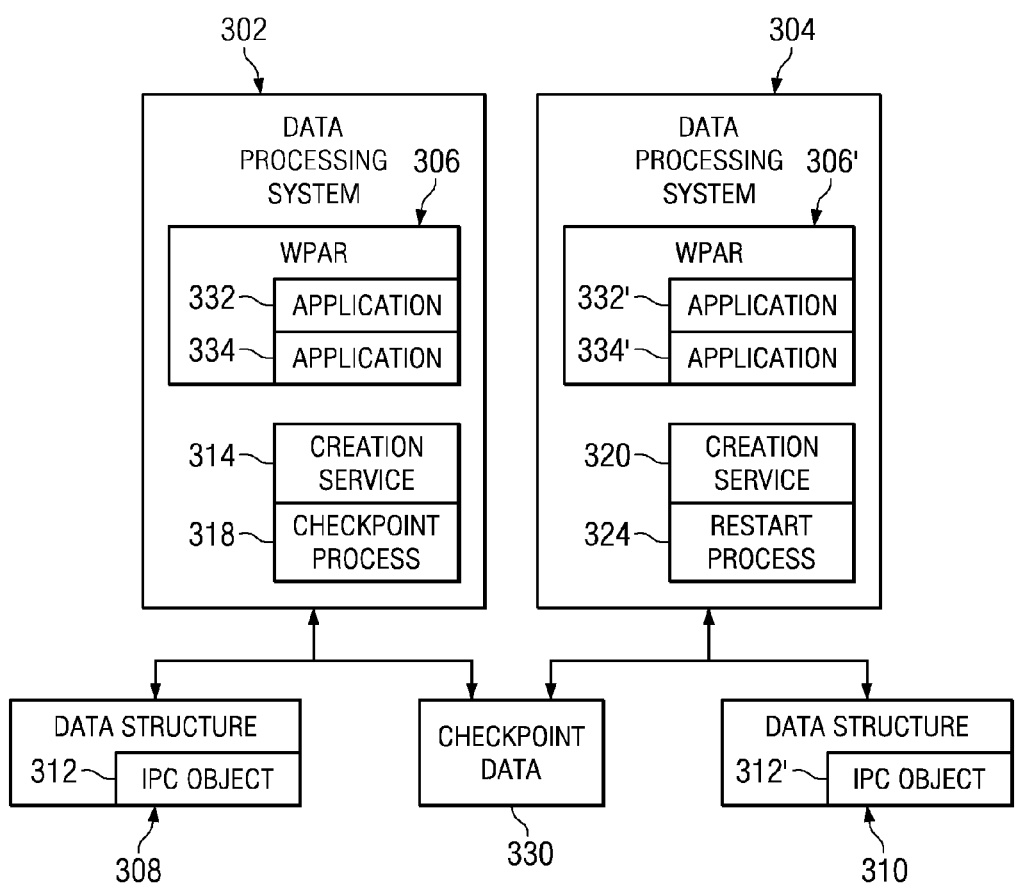
FIG. 3 is a block a diagram of a system for migrating a WPAR in accordance with an exemplary embodiment.

Turning back to the figures, FIG. 3 is a block a diagram of a system for migrating a WPAR in accordance with an exemplary embodiment. System 300 comprises data processing systems 302 and 304, data structures 308 and 310, and checkpoint data 330. Data processing systems 302 and 304 may be implemented as data processing system 200 in FIG. 2. Data structures 308 and 310 represent a set of IPC data structures. Data structures 308 and 310 may be implemented as any type of data structure, including tables, databases, strings, and so forth, or any combination thereof. Further, a set of data structures may comprise one data structure or multiple data structures. Thus, each workload partition and kernel in a data processing system may have its own individual data structure in data structure 308, or data structure 308 may comprise only one data structure containing all of the necessary information, or any combination thereof.

Data processing system 302 comprises creation service 314, checkpoint process 318, and workload partition, WPAR 306. WPAR 306 is comprised of two applications, application 332 and 334. Data structure 308 comprises the mapping information that maps the kernel handle that WPAR 306 and data processing system 302 use for IPC object 312 and maps the IPC name to the kernel handle used by data processing system 302 for IPC object 312. When an application, such as application 332 or 334, needs to use a particular IPC object, the application first needs to get a handle to that object. Application 332 then calls to creation service 314 and provides the name of the IPC object application 332 wants to open. For POSIX message queue and semaphore objects, the kernel of data processing system 302 returns the kernel handle to the IPC object, such as IPC object 312, to application 332. Application 332 copies the kernel handle into a memory location of application 332. The address of this memory location is an IPC descriptor for this object. Application 332 uses this descriptor to refer IPC object 312 after opening IPC object 312. For POSIX IPC shared memory objects the kernel returns a file descriptor which the process uses as a descriptor (or handle) to the shared memory IPC object.

Checkpoint process 318 checkpoints WPAR 306 so that WPAR 306 may be moved to another data processing system, such as data processing system 304. The moved WPAR 306 is represented by WPAR 306'. The moved application 332 and 334 in WPAR 306' are presented by application 332' and 334'. When WPAR 306 is moved to the new data processing system, WPAR 306' wants to be able to use the same IPC object 312 that WPAR 306 used in data processing system 302. Thus, when checkpoint process 318 checkpoints WPAR 306, checkpoint process 318 also checkpoints IPC object 312 and captures information from data structure 308, including an identifier that identifies WPAR 306 and stores this information in checkpoint data 330.

Restart process 324 restarts WPAR 306' on data processing system 304. When restart process 324 creates a new IPC object, restart process 324 uses information stored in checkpoint data 330 to modify the newly created IPC object to make the newly created IPC object, IPC object 312' appear the same as IPC object 312. Before restart process 324 issues a call for creation of an IPC object, restart process 324 registers the virtual handle that restart process 324 needs back form the kernel. This handle was saved at the time of checkpointing WPAR 306. When application 332' issues a call to creation service 320 and provides the name of the IPC object application 332' wants to open, data structure 310 is checked to determine an exact match for both the IPC name submitted by application 332' and the WPAR identifier of WPAR 306', which is the WPAR in which application 332' is operating. Once this matching is made, the kernel of data processing system 304 returns a virtual kernel handle to IPC object 312' to application 332'. This virtual kernel handle is mapped to the real kernel handle used by the kernel. This mapping is stored in data structure 310. Thus, application 332' stores the virtual kernel handle into a memory location of application 332'. Therefore, when application 332' wants to use IPC object 312', application 332' will use the virtual kernel handle to communicate with the kernel. When the kernel receives this virtual handle, the kernel will refer the information stored in data structure 310 to determine the real identifier for the IPC object used by the kernel.

FIG. 4 is a block diagram illustrating a mapping of identifiers in accordance with an exemplary embodiment. Data processing system 400 may be implemented as a data processing system, such as data processing system 200 of FIG. 2. Data processing system 400 comprises workload partition, WPAR 402 that has been migrated from another data processing system (not shown) and restarted. Data processing system 400 comprises user space 410, which is the portion of data processing system 400 above line 408 and kernel space 412, which is the portion of data processing system 400 below line 408. WPAR 402 comprises applications 404 and 406. Portions of WPAR 402 and applications 404 and 406 exist in both user space 410 and kernel space 412. Kernel space 412 also comprises data structures name table 420 and mapping table 440, which may be implemented as data structure 310 in FIG. 3 and IPC object 450, which may be implemented as IPC object 312' in FIG. 3.

Mapping table 440 is used to map the virtual kernel handles used by workload partitions to refer to the IPC object to the real kernel handle used by the kernel space to refer to the IPC objects. In an exemplary embodiment, mapping table 440 comprises two columns. In other exemplary embodiments, more columns could be used in mapping table 440. In an exemplary embodiment, the two columns are entitled virtual kernel handle 442 and real kernel handle 444. In an exemplary embodiment, a separate mapping table 440 exists for each workload partition. These tables are associated with the specific workload partition identifier of each workload partition. Thus, to look-up entries in the table of a particular workload partition, the system must first identify the corresponding mapping table using the workload partition identifier for the workload partition. Row 446 of mapping table 440 shows that the virtual kernel handle, V-kernel_handle 416 used by applications 404 and 406 in WPAR 402 to refer to IPC object 450 is mapped to real kernel handle kernel_handle 428, which kernel space 412 uses to refer to IPC object 450. Row 448 shows a virtual kernel handle v_kernel_handle 436 that is mapped to real kernel handle 429, which refers to an IPC object (not shown) other than IPC object 450.

In an exemplary embodiment, IPC objects of one workload partition are differentiated from IPC objects of another workload partition by tracking a WPAR identifier field in the name table for creating IPC objects. Thus, two different workload partitions having an IPC object with same name will refer to different IPC objects, as illustrated in name table 420. In an exemplary embodiment, name table 420 comprises three columns. In other exemplary embodiments, more columns could be used in name table 420. In an exemplary embodiment, the three columns are entitled name 422, WPAR ID 424 and kernel handle 426. For IPC shared memory objects, the kernel handles are not virtualized. Instead, the same file descriptor that was being used at checkpoint time is setup during the restart to refer to the IPC shared memory object. In the name table for the IPC shared memory objects, the WPAR ID field is inserted to distinguish between the IPC objects of different WPARS on the same system.

Entries in name 422 refer to the IPC name used by an application in order to create an IPC object. Entries in WPAR ID 424 represent the workload partition identifier of the workload partition in which the application is running. Entries in kernel handle 426 are the virtual kernel handles used the application to refer to the IPC object. Row 430 of name table 420 shows entries ABC for name 422, XYZ for WPAR ID and kernel handle v_kernel_handle 416. Row 432 has ABC as an entry for name 422, 123 as an entry for WPAR ID 424 and v_kernel_handle 434 as an entry for kernel handle 426. Thus, even though rows 430 and 432 have the same entry under name 422, ABC, as the names are paired with a specific workload partition identifier, calls using the same name refers to different IPC objects, as the virtual kernel handles stored in kernel handle 426 are mapped to different real kernel handles, which refer to different IPC objects.

Thus, when an application, such as application 404, needs to use a particular IPC object, the application first needs to get a handle to that object. Application 404 issues a creation call. In a workload partition that has been restarted, the virtual handle that the application wants to use for a particular IPC object is registered with kernel space 412 and stored in name table 420. Then, when the creation call is issued by the application, the name supplied by the application and the workload partition identifier of the workload partition that the application is running in are looked up in name table 420 and the virtual kernel handle stored in name table 420, which is then mapped to the real kernel handle used by kernel space 412 to refer to IPC object 450.

This virtual kernel handle is then linked to a file descriptor and this file descriptor is returned by the open calls. The application uses this file descriptor to refer to IPC objects after creating the IPC objects. The kernel handle for an IPC object is created when the IPC object is created. The kernel also keeps a map of the IPC object name against the kernel handle to convert from name to the IPC object. For the IPC semaphore and message queue objects the kernel keeps a per-process IPC descriptor table, such as descriptor table 418 and 419 for applications 404 and 406, respectively. The descriptor table maps the kernel handle to an IPC descriptor. For example, in application 404, descriptor table 418 maps virtual kernel handle, v_kernel_handle 416 to descriptor 414, which is an IPC descriptor. The descriptor had already been linked to this virtual kernel handle when the process was running on the previous data processing system and stored in the address space of the application. At the time the process was running on the previous data processing system, v_kernel_handle 416 was not a virtual kernel handle, but was the actual kernel handle used by application 404 to communicate with an IPC object.

Thus, when application 404 wants to use IPC object 450, application 404 uses descriptor 414, which points to v_kernel_handle 416. This virtual kernel handle is then passed to kernel space 412, which determines the WPAR ID of the workload partition that application 404 is running in. Once this determination is made, kernel space 412 locates the mapping table for that particular WPAR ID, mapping table 440, and looks up the real kernel handle associated with the virtual kernel handle passed from application 404 and accesses IPC object 450.

Figure 5:
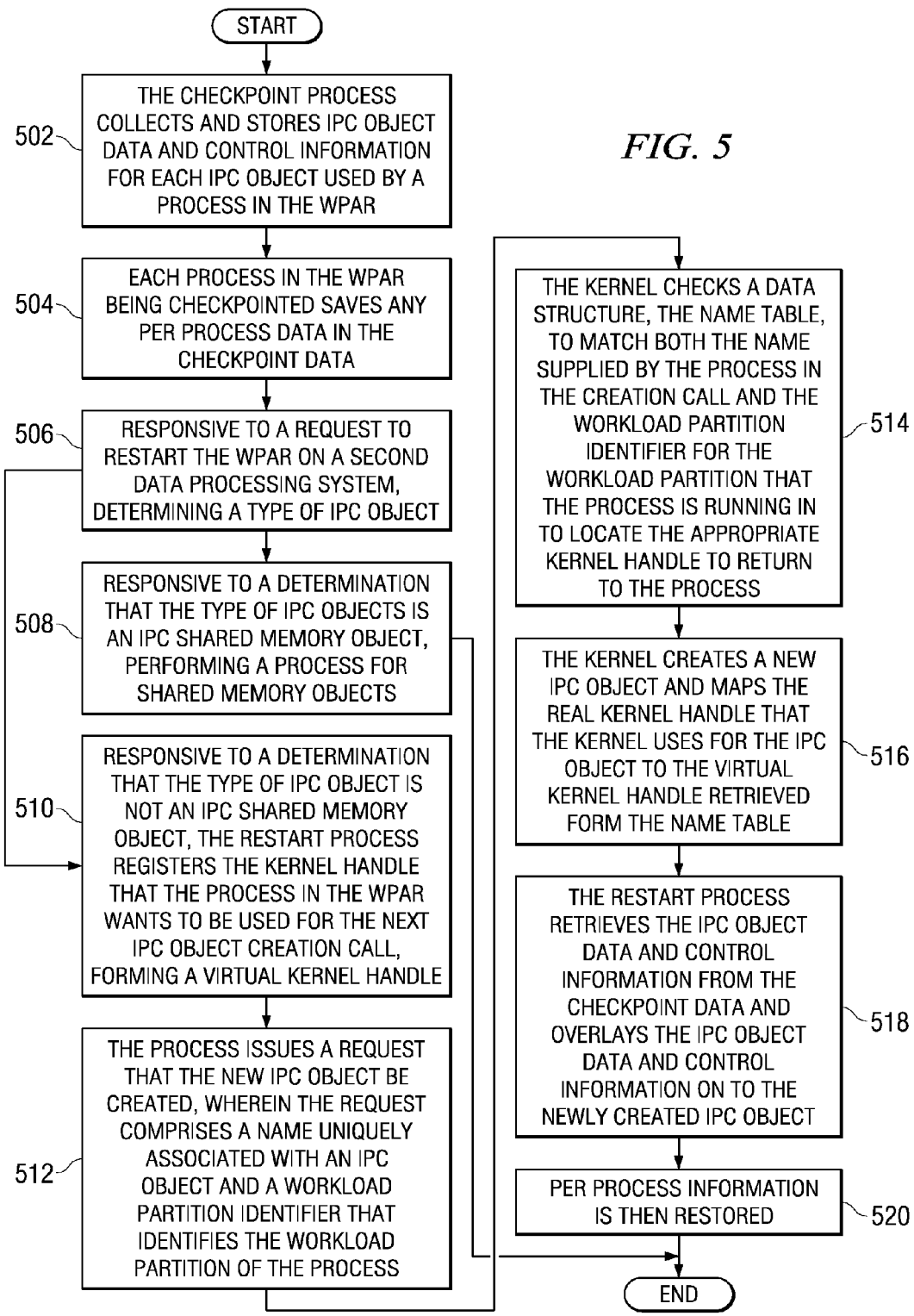
FIG. 5 is flowchart illustrating the operation of migrating a WPAR in accordance with an exemplary embodiment.

FIG. 5 is flowchart illustrating the operation of migrating a WPAR in accordance with an exemplary embodiment. The operation of FIG. 5 may be performed by a checkpoint and restart process, such as checkpoint process 318 and restart process 324 of FIG. 3. The operation begins when the checkpoint process collects and stores IPC object data and control information for each IPC object used by a process in the WPAR (step 502). This collecting and storing is done in response to a checkpoint process being started on the workload partition in a first data processing system. Each process in the WPAR being checkpointed saves any per-process data in the checkpoint data (step 504).

Responsive to a request to restart the WPAR on a second data processing system, a type of IPC object is determined (step 506). Responsive to a determination that the type of IPC object is an IPC shared memory object, a process for shared memory objects is performed (step 508) and the operation ends. Responsive to a determination that the type of IPC object is not an IPC shared memory object, the restart process registers the kernel handle that the process in the WPAR wants to be used for the next IPC object creation call, forming a virtual kernel handle (step 510). The process issues a request that the new IPC object be created, wherein the request comprises a name uniquely associated with an IPC object and a workload partition identifier that identifies the workload partition of the process (step 512). The kernel checks a data structure, the name table, to match both the name supplied by the process in the creation call and the workload partition identifier for the workload partition that the process is running in to locate the appropriate kernel handle to return to the process (step 514). This kernel handle is the virtual kernel handle registered in step 510. The kernel creates a new IPC object and maps the real kernel handle that the kernel uses for the IPC object to the virtual kernel handle retrieved from the name table (step 516). The restart process retrieves the IPC object data and control information from the checkpoint data and overlays the IPC object data and control information onto the newly created IPC object (step 518). Per-process information is then restored (step 520) and the operation ends.

Exemplary embodiments provide for creating a data structure populated with mapping information that maps the virtual kernel handle used by a process in the WPAR to the WPAR and to the real kernel handle used by the kernel operating system and the IPC object itself. This data structure may be implemented in many forms, including a database, a table, and a kernel extension.

There are two general stages in the checkpoint of the WPAR. The first stage is where the global data is collected and the second stage is where pre process information is collected. For IPC semaphore objects at the time of the checkpointing of global data, the following global data is collected: (1) the name of the IPC semaphore object; (2) the kernel handle of the IPC semaphore object; (3) a list of processes waiting on the semaphore object; (4) the state of the IPC semaphore object; and (5) the attributes of the IPC semaphore object. A semaphore object regulates access to limited resources. If a process tries to gain access to a resource using a semaphore object when all the resources are already being used, the process is put to sleep, or waits on that resource, and wakes up when one or more resources are available.

The following data is captured for each process for each IPC semaphore object the process uses: (1) the list of descriptors for each IPC semaphore object opened by the process; and (2) the file access mode in which the process has opened each of the IPC semaphore objects.

At the time of the checkpoint of global data, the following IPC message queue object global data is collected: (1) name of the IPC message queue object; (2) the kernel handle of the IPC message queue object; (3) message queue permissions; (4) current number of bytes on the message queue; (5) current number of messages on the message queue; (6) maximum number of bytes that are allowed on the message queue; (7) process identifier of last process to send a message; (8) process identifier of last process to receive a message; (9) time the last message to be sent was sent; and (10) time the last message to be received was received. Also, the following information is recorded for each message in each message queue: (1) the time the message was sent; (2) the effective user identifier of the author of the message; (3) the effective global identifier of the author of the message; (4) the process identifier of the author of the message; (5) a message type; and (6) message data. The following data is captured for each process for each IPC message queue objects: (1) the list of descriptors for the IPC message queue objects opened by the process; and (2) the file access mode in which the process has opened each of the IPC message queue objects. The checkpoint data is used to restore the state of the IPC message queue objects during a restart of a workload partition.

At the time of the checkpoint of global data, the following IPC shared memory object global data is collected: (1) name of the IPC shared memory object; (2) the kernel handle for the IPC shared memory object; (3) a total size of the shared memory segment of each IPC shared memory object; (4) a process identifier for the process that created the IPC shared memory object; (5) a process identifier for last shared memory operation (shmop) process; (6) a current number of processes attached to the shared memory segment; (7) a last time the shared memory segment was attached to (shmat time); (8) a last time the shared memory segment was detached from (shmdt time); and (9) a last time the shared memory segment was changed. The following data is captured for each process for each IPC shared memory object: (1) a list of file descriptors used for the IPC shared memory object by the process; (2) the file open modes associated with each file descriptor; (3) a kernel handle associated with the file descriptor; (4) a start offset of the mapping and the size of the mapping. The checkpointed data is used to restore the state of the IPC shared memory object during the restart.

Figure 6:
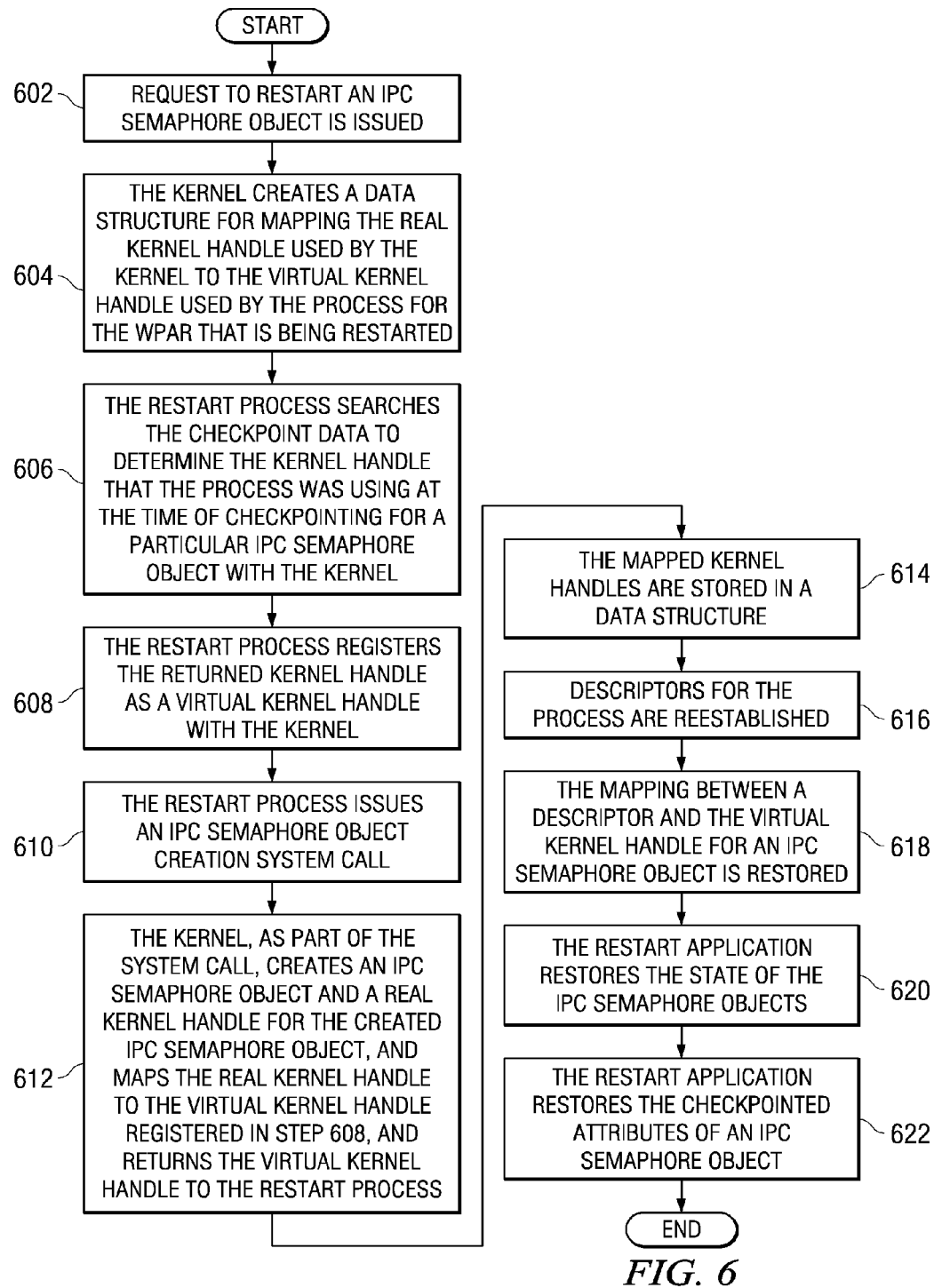
FIG. 6 is flowchart illustrating the operation of restarting an IPC semaphore object in accordance with an exemplary embodiment.

FIG. 6 is a flowchart illustrating the operation of restarting an IPC semaphore object in accordance with an exemplary embodiment. The operation of FIG. 6 may be performed by a restart process, such as restart process 324 in FIG. 3. FIG. 6 is expanded view of steps 510-518 of FIG. 5. The operation begins when a request to restart an IPC semaphore object is issued (step 602). The kernel creates a data structure for mapping the real kernel handle used by the kernel to the virtual kernel handle used by the process for the WPAR that is being restarted (step 604). The restart process searches the checkpoint data to determine the kernel handle that the process was using at the time of checkpointing for a particular IPC semaphore object with the kernel (step 606). The restart process registers the returned kernel handle as a virtual kernel handle with the kernel (step 608). The restart process issues an IPC semaphore object creation system call (step 610). The kernel, as part of the system call, creates an IPC semaphore object and a real kernel handle for the created IPC semaphore object, and maps the real kernel handle to the virtual kernel handle registered in step 608, and returns the virtual kernel handle to the restart process (step 612). The mapped kernel handles are stored in a data structure (step 614).

The restart application creates new IPC semaphore objects using sem_open( ). The sem_open( ) system call creates the POSIX IPC semaphore object and the associated UNIX SYSTEM V IPC semaphore object. During this, the virtual kernel handle returned to the kernel will be the one registered by the restart application.

At the time of checkpoint, each process in the WPAR would have a per-process descriptor for each POSIX object that it had opened. Descriptors for the process are reestablished (step 616). The mapping between a descriptor and the virtual kernel handle for an IPC semaphore object is restored (step 618). This is achieved by calling the system call (xyz) in the context of each process of the WPAR. The restart application restores the state of the IPC semaphore objects (step 620). The values for the state of the IPC semaphore object were stored in the checkpoint data during the checkpoint process. The restart application restores the checkpointed attributes of an IPC semaphore object (step 622) and the process ends. The restart application restores the checkpointed attributes of an IPC semaphore object using a system call by passing sem info structure, which updates the attributes in the POSIX semaphore object as well as the associated UNIX SYSTEM V IPC semaphore object. In an exemplary embodiment, unnamed IPC semaphore objects are recreated using the same steps mentioned above.

Figure 7:
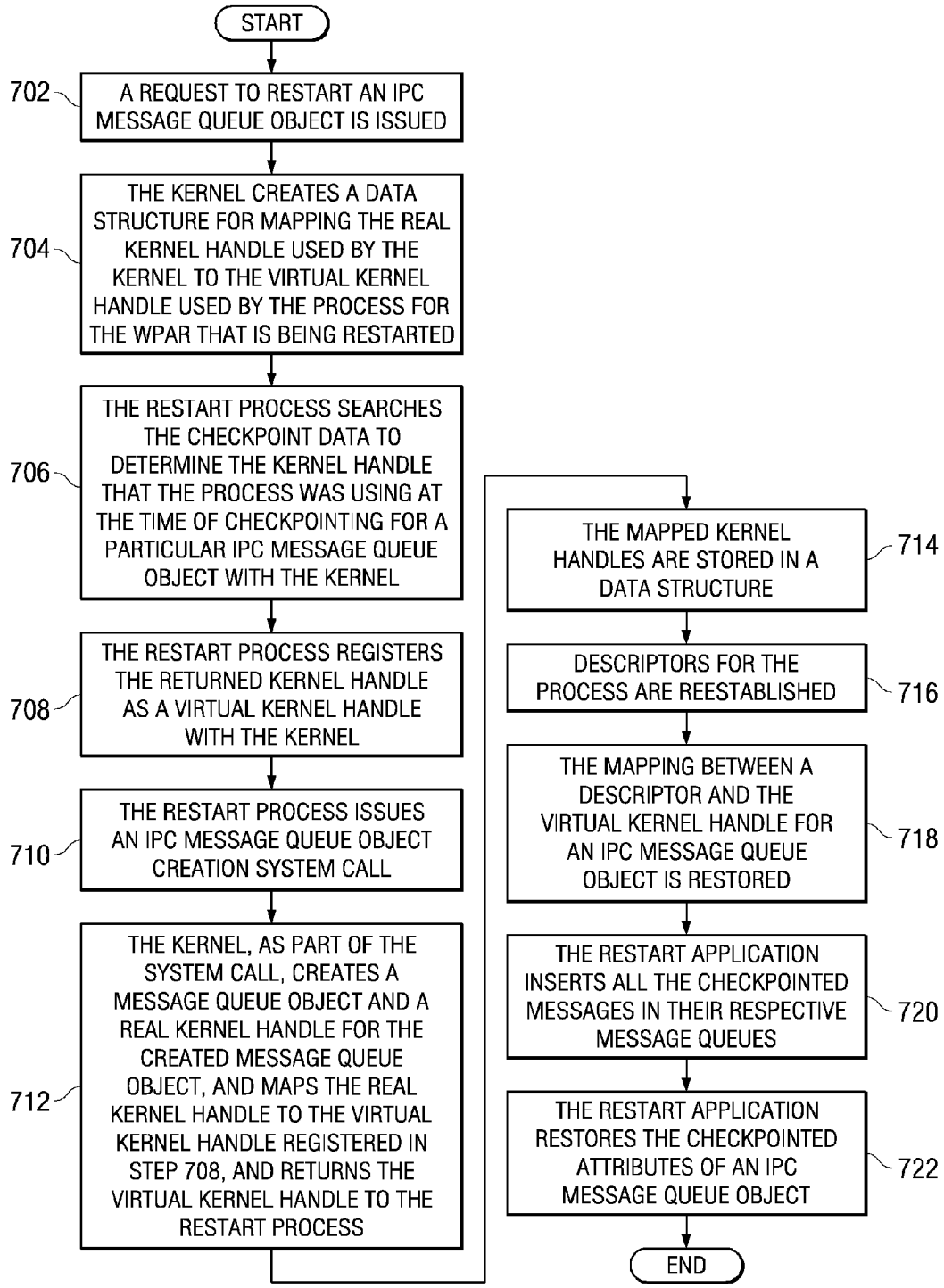
FIG. 7 is flowchart illustrating the operation of restarting an IPC message queue object in accordance with an exemplary embodiment.

FIG. 7 is a flowchart illustrating the operation of restarting an IPC message queue object in accordance with an exemplary embodiment. The operation of FIG. 7 may be performed by a restart process, such as restart process 324 in FIG. 3. FIG. 7 is expanded view of steps 510-518 of FIG. 5. The operation begins when a request to restart an IPC message queue object is issued (step 702). The kernel creates a data structure for mapping the real kernel handle used by the kernel to the virtual kernel handle used by the process for the WPAR that is being restarted (step 704). The restart process searches the checkpoint data to determine the kernel handle that the process was using at the time of checkpointing for a particular IPC message queue object with the kernel (step 706). The restart process registers the returned kernel handle as a virtual kernel handle with the kernel (step 708). The restart process issues an IPC message queue object creation system call (step 710). The kernel, as part of the system call, creates a message queue object and a real kernel handle for the created message queue object, and maps the real kernel handle to the virtual kernel handle registered in step 708, and returns the virtual kernel handle to the restart process (step 712). The mapped kernel handles are stored in a data structure (step 714).

The restart application creates new IPC message queue objects using mq_open( ). The mq_open( ) system call creates the POSIX IPC message queue object and the associated UNIX SYSTEM V IPC message queue object. During this, the virtual kernel handle returned to the kernel will be the one registered by the restart application.

At the time of checkpoint, each process in the WPAR would have a per-process descriptor for each POSIX object that it had opened. Descriptors for the process are reestablished (step 716). The mapping between a descriptor and the virtual kernel handle for an IPC message queue object is restored (step 718). This is achieved by calling the system call (xyz) in the context of each process of the WPAR. The restart application inserts all the checkpointed messages in their respective message queues (step 720). This is done using a system call. The restart application restores the checkpointed attributes of an IPC message queue object (step 722) and the process ends. The restart application restores the checkpointed attributes of an IPC semaphore object using a system call by passing mq_info structure, which updates the attributes in the POSIX IPC message queue object as well as the associated UNIX SYSTEM V IPC s message queue object.

Figure 8:
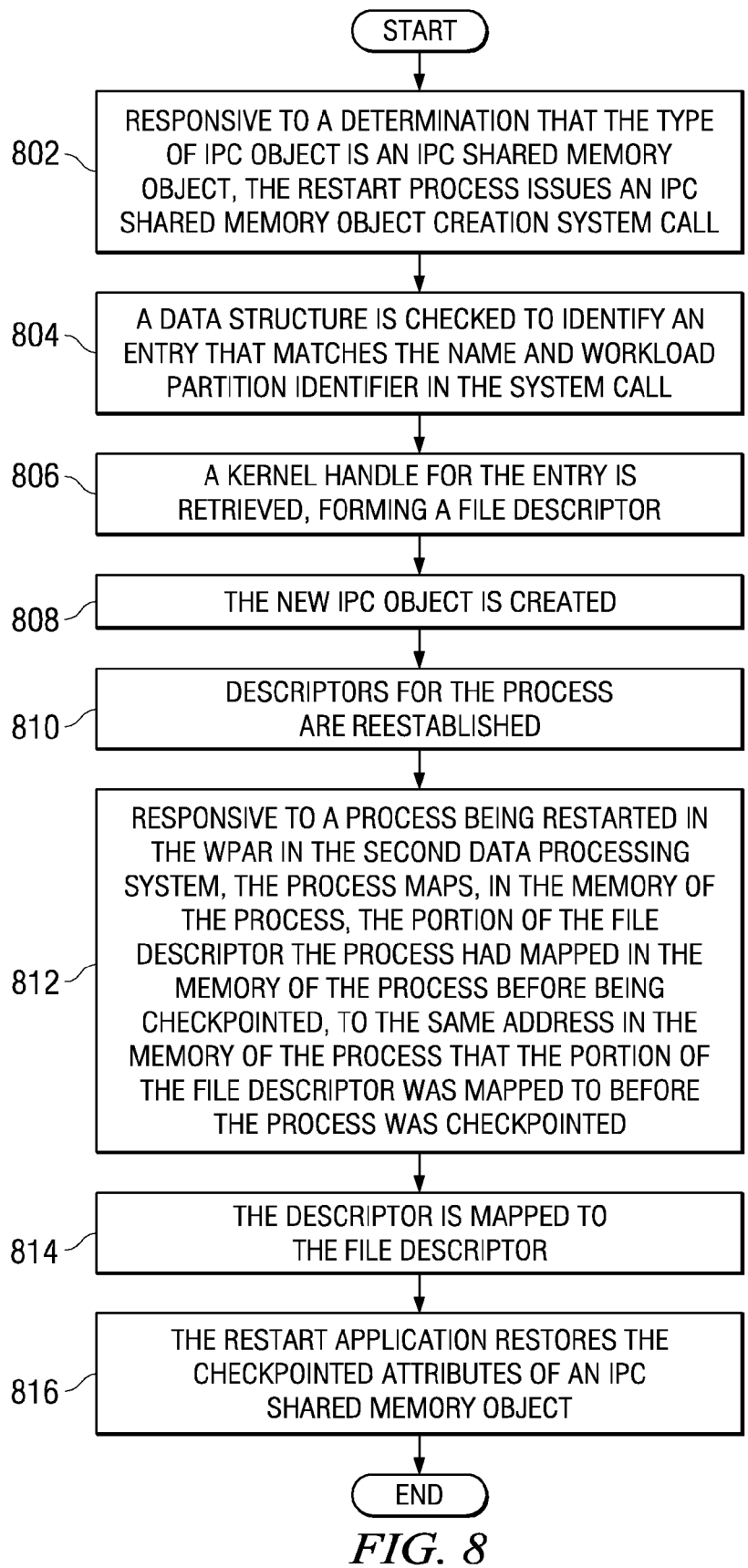
FIG. 8 is flowchart illustrating the operation of checkpointing an IPC shared memory object in accordance with an exemplary embodiment.

FIG. 8 is a flowchart illustrating the operation of restarting an IPC shared memory object in accordance with an exemplary embodiment. The operation of FIG. 8 may be performed by a restart process, such as restart process 324 in FIG. 3. FIG. 8 is an expanded view of step 508 of FIG. 5. The operation begins when, responsive to a determination that the type of IPC object is an IPC shared memory object, the restart process issues an IPC shared memory object creation system call (step 802). The shared memory objection creation system call also includes a name uniquely associated with a specific IPC shared memory object and a workload partition identifier that identifies the workload partition the process is running in.

The restart application creates new IPC shared memory objects using shm_open( ). The shm_open( ) system call creates the POSIX IPC shared memory object and the associated UNIX SYSTEM V IPC shared memory object. A data structure is checked to identify an entry that matches the name and workload partition identifier in the system call (step 804). A kernel handle for the entry is retrieved, forming a file descriptor (step 806). The new IPC object is created (step 808).

At the time of checkpoint, each process in the WPAR would have a per-process descriptor for each POSIX object that it had opened. Descriptors for the process are reestablished (step 810). Since the kernel handle for IPC shared memory objects have an entry in the file descriptor table and in the file table, there is no need to restart per-process descriptors separately. The per-process descriptors will be restarted when the file descriptor table and file table are restarted. The fdinfo( ) call called by each process in the WPAR at restart time will take care of this.

Responsive to a process being restarted in the WPAR in the second data processing system, the process maps, in the memory of the process, the portion of the file descriptor the process had mapped in the memory of the process before being checkpointed, to the same address in the memory of the process that the portion of the file descriptor was mapped to before the process was checkpointed (step 812). The descriptor is mapped to the file descriptor (step 814). The restart application restores the checkpointed attributes of an IPC shared memory object (step 816) and the process ends. The restart application restores the checkpointed attributes of an IPC shared memory object using a system call by passing shm_info structure, which updates the attributes in the POSIX IPC shared memory object as well as the associated UNIX SYSTEM V IPC shared memory object.

Thus exemplary embodiments provide for checkpointing and restarting workload partitions. Exemplary embodiments provide for retrieving the state and the attributes of the IPC objects from the user space during the checkpoint of a WPAR from user space. Further, exemplary embodiments restore the attributes and state saved during checkpointing the WPAR from user space during the restarting of the WPAR on the new data processing system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for migrating a workload partition, the computer implemented method comprising:
responsive to starting a checkpoint process on the workload partition in a first data processing system, collecting data and control information for each inter-process communication (IPC) object used by each process in the workload partition;
storing the data and control information, forming checkpoint data;
responsive to receiving a request to restart the workload partition in a second data processing system, determining a type of IPC object, wherein the checkpoint process and the restart are driven from the user space;
responsive to a determination that the type of IPC object is not an IPC shared memory object, registering a kernel handle that a process in the workload partition wants to be used for a new IPC object that is to be created, forming a virtual kernel handle;
issuing a request, by the process, that the new IPC object be created, wherein the request comprises a name uniquely associated with an IPC object and a workload partition identifier that identifies the workload partition of the process;

checking a data structure to identify an entry that matches the name and the workload partition identifier in the request;

retrieving the virtual kernel handle for the entry;

creating the new IPC object;

mapping the virtual kernel handle to a kernel handle used by the kernel for the IPC object;

returning the virtual kernel handle to the process;

retrieving the data and control information for an IPC object associated with the virtual kernel handle from the checkpoint data;

overlaying the data and control information on to the new IPC object; and restoring per-process information.

2. The computer implemented method of claim 1, further comprising:

wherein the type of the IPC object is an IPC semaphore object;

wherein the new IPC object is a new IPC semaphore object;

creating a second data structure that is uniquely associated with the workload partition that stores the mapping of the virtual kernel handle to the kernel handle used by the kernel for the IPC semaphore object;

wherein registering the kernel handle that the process in the workload partition wants to be used for the new IPC object that is to be created, forming the virtual kernel handle comprises:

searching the checkpoint data to identify the kernel handle that the process was using for a specific IPC semaphore object when the process was checkpointed;

reestablishing a descriptor for the process;

restoring a mapping between the descriptor and the virtual kernel handle; and wherein overlaying the data and control information on to the new IPC object comprises:

restoring a state of the IPC semaphore object by applying the state of the IPC semaphore object to the new IPC semaphore object; and restoring attributes of the IPC semaphore object by applying the attributes of the IPC semaphore object to the new IPC semaphore object.

3. The computer implemented method of claim 1, further comprising:

wherein the type of the IPC object is an IPC message queue object;

wherein the new IPC object is a new IPC message queue object;

creating a second data structure that is uniquely associated with the workload partition that stores the mapping of the virtual kernel handle to the kernel handle used by the kernel for the IPC message queue object;

wherein registering the kernel handle that the process in the workload partition wants to be used for the new IPC object that is to be created, forming the virtual kernel handle comprises:

searching the checkpoint data to identify the kernel handle that the process was using for a specific IPC message queue object when the process was checkpointed;

reestablishing a descriptor for the process;

restoring a mapping between the descriptor and the virtual kernel handle; and wherein overlaying the data and control information on to the new IPC object comprises:

inserting all checkpointed messages in their respective message queues; and restoring attributes of the IPC message queue object by applying the attributes of the IPC message queue object to the new IPC message queue object.

4. The computer implemented method of claim 1, further comprising:

responsive to a determination that the type of IPC object is an IPC shared memory object, issuing a request, by the process, that a new IPC shared memory object be created, wherein the request includes a name uniquely associated with an IPC shared memory object and workload partition identifier that identifies the workload partition of the process;

checking a data structure to identify an entry that matches the name and the workload partition identifier in the request;

retrieving the kernel handle for the entry, forming a file descriptor;

creating the new IPC object;

reestablishing descriptors for the process;

responsive to the process being restarted in the workload partition in the second data processing system, mapping, by the process, in a memory of the process at the new data processing system, a portion of the file descriptor that the process had mapped in the memory of the process before being checkpointed, to a same address in the memory of the process that the portion of the file descriptor was mapped to before the process was checkpointed;

mapping a descriptor associated with the entry to the file descriptor; and restoring attributes of the IPC shared memory by applying the attributes of the IPC shared memory object to the new IPC shared memory object.

5. The computer implemented method of claim 1, wherein the checkpoint data comprises global data and non-global data.

6. The computer implemented method of claim 5, wherein the global data comprises the name of the IPC object, and the kernel handle of the IPC object.

7. The computer implemented method of claim 5, wherein the non-global data comprises a list of descriptors for each IPC object opened by the process and a file access mode of the process when the process opened the IPC object.

8. A computer program product for migrating a workload partition, the computer program product comprising:

a non-transitory computer usable medium having computer usable program code tangibly embodied thereon, the computer usable program code comprising:

computer usable program code for, responsive to starting a checkpoint process on the workload partition in a first data processing system, collecting data and control information for each inter-process communication (IPC) object used by each process in the workload partition;

computer usable program code for storing the data and control information, forming checkpoint data;

computer usable program code for, responsive to receiving a request to restart the workload partition in a second data processing system, determining a type of IPC object, wherein the checkpoint process and the restart are driven from the user space;

computer usable program code for, responsive to a determination that the type of IPC object is not an IPC shared memory object, registering a kernel handle that a process in the workload partition wants to be used for a new IPC object that is to be created, forming a virtual kernel handle;

computer usable program code for issuing a request, by the process, that the new IPC object be created, wherein the request comprises a name uniquely associated with an IPC object and a workload partition identifier that identifies the workload partition of the process;

computer usable program code for checking a data structure to identify an entry that matches the name and the workload partition identifier in the request;

computer usable program code for retrieving the virtual handle for the entry;

computer usable program code for creating the new IPC object;

computer usable program code for mapping the virtual kernel handle to a kernel handle used by the kernel for the IPC object;

computer usable program code for returning the virtual kernel handle to the process;

computer usable program code for retrieving the data and control information for an IPC object associated with the virtual kernel handle from the checkpoint data;

computer usable program code for overlaying the data and control information on to the new IPC object; and computer usable program code for restoring per-process information.

9. The computer program product of claim 8, further comprising:

wherein the type of the IPC object is an IPC semaphore object;

wherein the new IPC object is a new IPC semaphore object;

computer usable program code for creating a second data structure that is uniquely associated with the workload partition that stores the mapping of the virtual kernel handle to the kernel handle used by the kernel for the IPC semaphore object;

wherein the computer usable program code for, responsive to receiving the request to restart the workload partition in a second data processing system, registering the kernel handle that the process in the workload partition wants to be used for the new IPC object that is to be created, forming the virtual kernel handle comprises:

computer usable program code for searching the checkpoint data to identify the kernel handle that the process was using for a specific IPC semaphore object when the process was checkpointed;

computer usable program code for reestablishing a descriptor for the process;

computer usable program code for restoring a mapping between the descriptor and the virtual kernel handle; and wherein the computer usable program code for overlaying the data and control information on to the new IPC object comprises:

computer usable program code for restoring a state of the IPC semaphore object by applying the state of the IPC semaphore object to the new IPC semaphore object; and computer usable program code for restoring attributes of the IPC semaphore object by applying the attributes of the IPC semaphore object to the new IPC semaphore object.

10. The computer program product of claim 8, further comprising:

wherein the type of the IPC object is an IPC message queue object;

wherein the new IPC object is a new IPC message queue object;

computer usable program code for creating a second data structure that is uniquely associated with the workload partition that stores the mapping of the virtual kernel handle to the kernel handle used by the kernel for the IPC message queue object;

wherein the computer usable program code for, responsive to receiving the request to restart the workload partition in a second data processing system, registering the kernel handle that the process in the workload partition wants to be used for the new IPC object that is to be created, forming the virtual kernel handle comprises:

computer usable program code for searching the checkpoint data to identify the kernel handle that the process was using for a specific IPC message queue object when the process was checkpointed;

computer usable program code for reestablishing a descriptor for the process;

computer usable program code for restoring a mapping between the descriptor and the virtual kernel handle; and wherein the computer usable program code for overlaying the data and control information on to the new IPC object comprises:

computer usable program code for inserting all checkpointed messages in their respective message queues; and computer usable program code for restoring attributes of the IPC message queue object by applying the attributes of the IPC message queue object to the new IPC message queue object.

11. The computer program product of claim 8, further comprising:

computer usable program code for, responsive to a determination that the type of IPC object is an IPC shared memory object, issuing a request, by the process, that a new IPC shared memory object be created, wherein the request includes a name uniquely associated with an IPC shared memory object and workload partition identifier that identifies the workload partition of the process;

computer usable program code for checking a data structure to identify an entry that matches the name and the workload partition identifier in the request;

computer usable program code for retrieving the kernel handle for the entry, forming a file descriptor;

computer usable program code for creating the new IPC object;

computer usable program code for reestablishing descriptors for the process;

computer usable program code for, responsive to the process being restarted in the workload partition in the second data processing system, mapping, by the process, in a memory of the process at the new data processing system, a portion of the file descriptor that the process had mapped in the memory of the process before being checkpointed, to a same address in the memory of the process that the portion of the file descriptor was mapped to before the process was checkpointed;

computer usable program code for mapping a descriptor associated with the entry to the file descriptor; and computer usable program code for restoring attributes of the IPC shared memory by applying the attributes of the IPC shared memory object to the new IPC shared memory object.

12. The computer program product of claim 8, wherein the checkpoint data comprises global data and non-global data.

13. The computer program product of claim 12, wherein the global data comprises the name of the IPC object, and the kernel handle of the IPC object.

14. The computer program product of claim 12, wherein the non-global data comprises a list of descriptors for each IPC object opened by the process and a file access mode of the process when the process opened the IPC object.

15. A data processing system for migrating a workload partition, the data processing system comprising:
- a bus;
- a storage device connected to the bus, wherein the storage device contains computer usable code; and
- a processing unit connected to the bus, wherein the processing unit executes the computer usable code to:
- responsive to starting a checkpoint process on the workload partition in a first data processing system, collect data and control information for each inter-process communication (IPC) object used by each process in the workload partition;
- store the data and control information, forming checkpoint data;
- responsive to receiving a request to restart the workload partition in a second data processing system, determine a type of IPC object, wherein the checkpoint process and the restart are driven from the user space;
- responsive to a determination that the type of IPC object is not an IPC shared memory object, register a kernel handle that a process in the workload partition wants to be used for a new IPC object that is to be created, forming a virtual kernel handle;
- issue a request, by the process, that the new IPC object be created, wherein the request comprises a name uniquely associated with an IPC object and a workload partition identifier that identifies the workload partition of the process;
- check a data structure to identify an entry that matches the name and the workload partition identifier in the request;
- retrieve the virtual kernel handle for the entry;
- create the new IPC object;
- map the virtual kernel handle to a kernel handle used by the kernel for the IPC object;
- return the virtual kernel handle to the process;
- retrieve the data and control information for an IPC object associated with the virtual kernel handle from the checkpoint data;
- overlay the data and control information on to the new IPC object; and
- restore per-process information.

16. The data processing system of claim 15, wherein the processor further executes the computer usable code to:
- wherein the type of the IPC object is an IPC semaphore object;
- wherein the new IPC object is a new IPC semaphore object;
- create a second data structure that is uniquely associated with the workload partition that stores the mapping of the virtual kernel handle to the kernel handle used by the kernel for the IPC semaphore object;
- wherein the processor executing the computer usable code to register the kernel handle that the process in the workload partition wants to be used for the new IPC object that is to be created, forming the virtual kernel handle comprises the processor further executing the computer usable code to search the checkpoint data to identify the kernel handle that the process was using for a specific IPC semaphore object when the process was checkpointed;
- reestablish a descriptor for the process;
- restore a mapping between the descriptor and the virtual kernel handle; and
- wherein the processor executing the computer usable code to overlay the data and control information on to the new IPC object comprises the processor further executing the computer usable code to restore a state of the IPC semaphore object by applying the state of the IPC semaphore object to the new IPC semaphore object; and
- restore attributes of the IPC semaphore object by applying the attributes of the IPC semaphore object to the new IPC semaphore object.

17. The data processing system of claim 15, wherein the processor further executes the computer usable code to:
- wherein the type of the IPC object is an IPC message queue object;
- wherein the new IPC object is a new IPC message queue object;
- create a second data structure that is uniquely associated with the workload partition that stores the mapping of the virtual kernel handle to the kernel handle used by the kernel for the IPC message queue object;
- wherein the processor executing the computer usable code to register the kernel handle that the process in the workload partition wants to be used for the new IPC object that is to be created, forming the virtual kernel handle comprises the processor further executing the computer usable code to search the checkpoint data to identify the kernel handle that the process was using for a specific IPC message queue object when the process was checkpointed;
- reestablish a descriptor for the process;
- restore a mapping between the descriptor and the virtual kernel handle; and
- wherein the processor executing the computer usable code to overlay the data and control information on to the new IPC object comprises the processor further executing the computer usable code to insert all checkpointed messages in their respective message queues; and
- restore attributes of the IPC message queue object by applying the attributes of the IPC message queue object to the new IPC message queue object.

18. The data processing system of claim 15, wherein the processor further executes the computer usable code to:
- responsive to a determination that the type of IPC object is an IPC shared memory object, issue a request, by the process, that a new IPC shared memory object be created, wherein the request includes a name uniquely associated with an IPC shared memory object and workload partition identifier that identifies the workload partition of the process;
- check a data structure to identify an entry that matches the name and the workload partition identifier in the request;
- retrieve the kernel handle for the entry, forming a file descriptor;
- create the new IPC object;
- reestablish descriptors for the process;
- responsive to the process being restarted in the workload partition in the second data processing system, map, by the process, in a memory of the process at the new data processing system, a portion of the file descriptor that the process had mapped in the memory of the process before being checkpointed, to a same address in the memory of the process that the portion of the file descriptor was mapped to before the process was checkpointed;
- map a descriptor associated with the entry to the file descriptor; and restore attributes of the IPC shared memory by applying the attributes of the IPC shared memory object to the new IPC shared memory object.

19. The data processing system of claim 15, wherein the checkpoint data comprises global data and non-global data.

20. The data processing system of claim 19, wherein the global data comprises the name of the IPC object, and the kernel handle of the IPC object.

* * * * *